Aug. 25, 1970  G. R. GAMERTSFELDER ET AL  3,525,569
VELOCITY MEASURING DEVICE
Filed April 11, 1968  2 Sheets-Sheet 1

United States Patent Office 3,525,569
Patented Aug. 25, 1970

---

3,525,569
VELOCITY MEASURING DEVICE
George R. Gamertsfelder, Pleasantville, Robert A. Flower, White Plains, and Gus Stavis, Briarcliff Manor, N.Y., assignors to Singer-General Precision, Inc., a corporation of Delaware
Filed Apr. 11, 1968, Ser. No. 720,555
Int. Cl. G01p *3/36;* G01s *9/44*
U.S. Cl. 356—28                                                10 Claims

ABSTRACT OF THE DISCLOSURE

A source of radiation, preferably a laser, directs a substantially monochromatic, very well collimated beam toward a reflecting surface. A portion of the backscattered energy is passed through an optical diffraction grating and received by a photomultiplier tube which has its anode connected to a frequency meter, the output of which is a function of the relative velocity between the radiation source and the backscattering surface. A lens element interposed between the optical grating and the surface, images "speckles" or lobes of backscattered energy directly onto the grating. Since the size of each "speckle" is now determined by the resolution limit of the lens they are small enough to satisfactorily limit decorrelation even under extreme conditions of surface flutter.

BRIEF DESCRIPTION OF THE INVENTION

The present invention relates generally to velocity measuring devices and more particularly to improvements in the velocity measuring device originally disposed in copending application Ser. No. 356,146, filed Mar. 31, 1964, now Pat. No. 3,432,237. The improvements described herein are also applicable to the differential velocity measuring device described in copending application Ser. No. 648,114, filed June 22, 1967, now abandoned. The instant case and the two copending applications are all commonly assigned.

In the velocity measuring device disclosed in the aforementioned copending application Ser. No. 356,146 a beam of monochromatic wave energy obtained from a suitable source such as a laser, for example, is directed toward the surface of an object having a velocity relative to the laser source. Because of the moving object's inherent surface irregularities the energy reflected from the illuminated area thereon will form a "granular" or "speckled" interference pattern in space comprising a multiplicity of minute lobes of backscattering energy having random amplitudes and phases. This "speckled" interference pattern will rotate in space at a velocity proportional to that of the object itself. Thus, when a portion of the backscattered energy is passed through an optical diffraction grating and then onto the cathode of a photomultiplier both of which are fixedly positioned near the laser source, the photomultiplier emits an output comprising a relatively narrow band spectral signal whose center frequency is directly related to the velocity of the moving surface.

In the application of this device to the measurement of the velocity of strip or "web" like materials as in steel and aluminum temper mills, for example, it has been found that certain problems arise tending to reduce the overall accuracy and effectiveness of the apparatus. One such problem involves random dynamic deviations in the radius of curvature of the strip material as measured in the vertical plane passing through the point where the laser beam illuminates the material. These deviations, often referred to as "flutter" cause the pattern of backscattered lobes of energy to decorrelate as they rotate past the refraction grating resulting in severe broadening of the photomultiplier output spectrum and degradation of the signal-to-noise ratio. When a lobe or speckle is said to decorrelate it is meant that its lifetime is shorter than is necessary to make a substantially complete scan or sweep across the diffraction grating.

In order to overcome this problem, the present invention provides an improved velocity measuring device having means for rendering the apparatus insensitive to flutter distortions in the strip material's pass-line while maintaining the system's calibration constant substantially independent of changes in range.

These and other objects and advantages as well as the exact nature of the invention will be more readily apparent from the following detailed description considered in conjunction with the attached drawings.

DETAILED DESCRIPTION OF THE INVENTION

Figure 1:
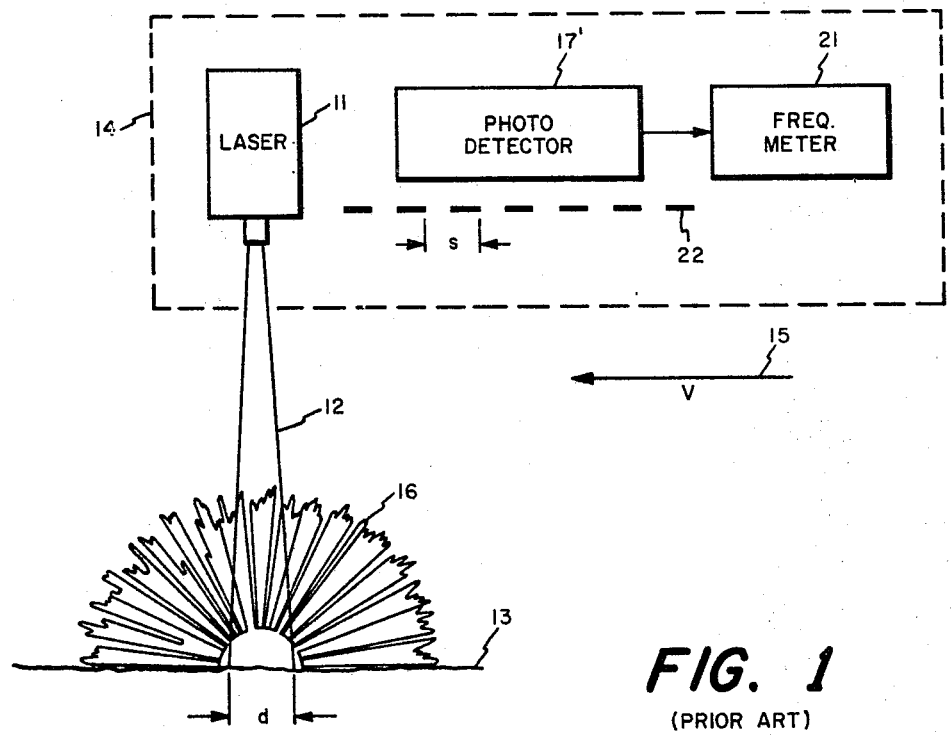
FIG. 1 is a schematic representation of a prior art velocity measuring device.

As shown schematically in FIG. 1, the prior art velocity measuring device comprises a laser 11 for projecting a beam 12 of essentially monochromatic radiation toward a backscattering surface 13. The laser is mounted on a supporting structure generally represented by the dashed rectangle 14 and fixed in space so that if the surface 13 is considered to be that of, say, a steel strip being processed in a temper mill, it may be assumed to have a relative velocity V in the direction indicated by vector 15. The impinging beam illuminates this moving surface over a finite area of diameter $d$ to produce a backscattered interference pattern 16 composed of distinct lobes of reflected radiation having random amplitudes and phases respectively. A portion of the backscattered energy is directed toward a receiving circuit also mounted on supporting structure 14 in fixed relation to laser source 11 which receiving circuit comprises a photomultiplier 17 or other suitable detector coupled to a frequency measuring device 21. Interposed between the photomultiplier and the backscattering surface as generally shown is a conventional optical diffraction grating 22 having an aperture spacing S. The grating is positioned so that its individual transparent or translucent apertures are longitudinally normal to the velocity vector 15. Because of the relative motion between the optical grating and the reflecting surface, the speckled interference pattern formed in space at the plane of the grating will be scanned or swept across the grating at a velocity related to the velocity V of the moving surface.

To understand this more precisely, consider a single lobe, for example, representing constructive interference produced by the contributions of scatterers included within a finite incremental portion of the illuminated area on surface 13. As the grating and lobe move relative to each other, the lobe actually sweeps across the grating much like a boy running a stick along a picket fence, so to speak. Accordingly, each time the lobe scans a separate aperture in the optical grating, the photomultiplier senses a corresponding magnitude variation at its cathode and, in turn, produces a pulse train output having a repetition frequency dependent only upon the rate at which the lobe scans the grating. However, to the eye of an observer located at the grating 22, the interference pattern would appear to comprise a multiplicity of "speckles" or "granules" of light moving in the direction of vector 15 thus indicating that a spatial distribution of many lobes simultaneously scans the optical grating at any given time. This arises from the fact that the beam illuminates an appreciable area on the moving surface containing many scattering centers. As a result, a multiplicity of similar but independent pulse trains are produced at the photomultiplier output. Furthermore, it will be seen that the spacing between individual "speckles" is random, hence the initiation of each pulse train associated with any one "speckle" or lobe occurs at a random instant in time. Accordingly, the photomultiplier output signal actually comprises a spectrum or band of frequencies having a peak or center frequency $f$ given by $$V'/S \qquad (1)$$

where $V'$ is equal to the velocity of the "speckles" at the grating and S represents the grating spacing. When the grating is positioned near the laser aperture, $V'$ is roughly equal to twice the velocity of the moving surface or $2V$. Hence, for the system of FIG. 1

$$f = \frac{2|V|}{S} \qquad (2)$$

or transposing $$|V| = \frac{S}{2} f \qquad (3)$$

It will be apparent that when the center frequency of the photomultiplier output spectrum is continuously computed by a suitable frequency tracker such as that disclosed in Pat. Nos. 2,896,074 and 2,915,748, an output will be made available comprising an analog signal whose amplitude is proportional to the velocity of the moving surface 13 with the term $S/2$ representing the system's calibration constant.

Now in the configuration described above, the velocity measuring system is capable of extremely accurate results provided the strip material or backscattering surface remains dimensionally stable with little or no dynamic deviation relative to the pass-line direction. In most applications, however, this requirement is rarely, if ever, met. For example, in temper mill operations, the steel strip is continuously subjected to anomalous vibrations and dimensional changes which effect "flutter" of the material in and out of the pass-line plane. With reference to FIG. 1, therefore, flutter may be defined as a continual random variation in the radius of curvature of surface 13, the radius being measured in the plane normal to such surface and including vector 15.

It has been found, unfortunately, that the irregular motion produced by such flutter deteriorates the performance of the velocity measuring system since the formation of each "speckle" or lobe depends upon contributions from scattering centers occupying a relatively large length of illuminated strip (~1 cm.). Bending of the strip produced by the flutter, particularly in the region of the illuminated area, causes changes in the relative phases of the scatterers and resultingly, the diffraction pattern of "speckles" sweeping across the diffraction grating 22 may be said to decorrelate. That is, the speckles may disappear and be replaced by different ones before scanning the entire grating. This results in a severe broadening of the output spectrum obtained from photomultiplier 17 and a consequent loss in signal-to-noise ratio.

Figure 2:
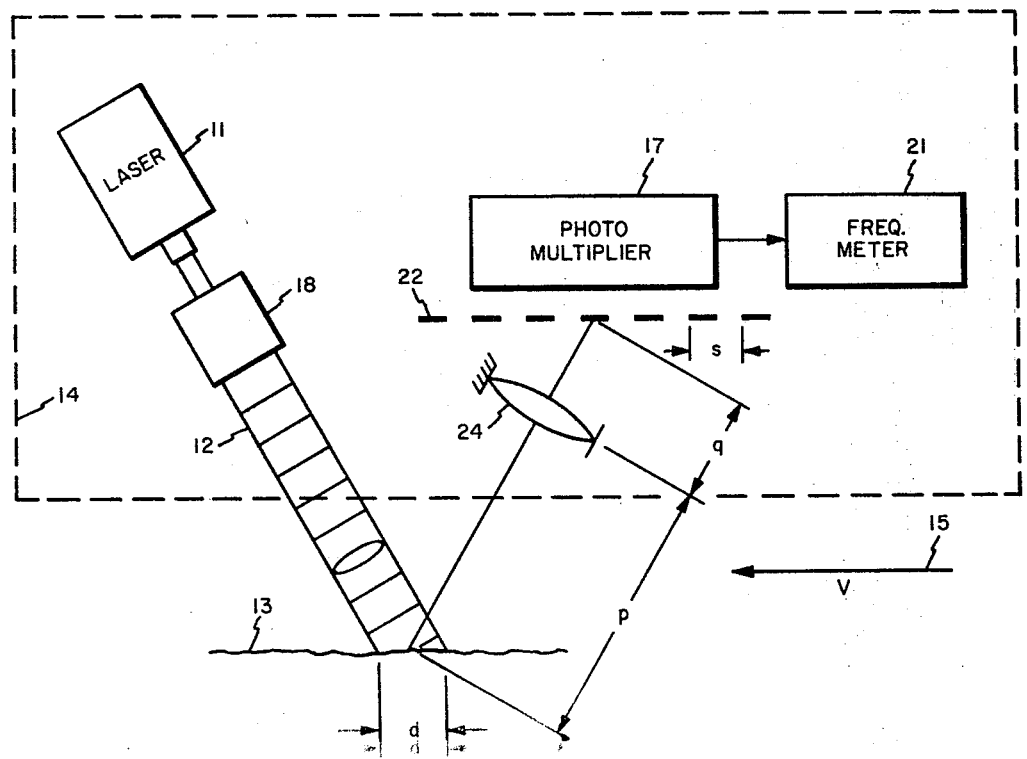
FIG. 2 is a schematic block diagram according to the present invention.
Figure 3:
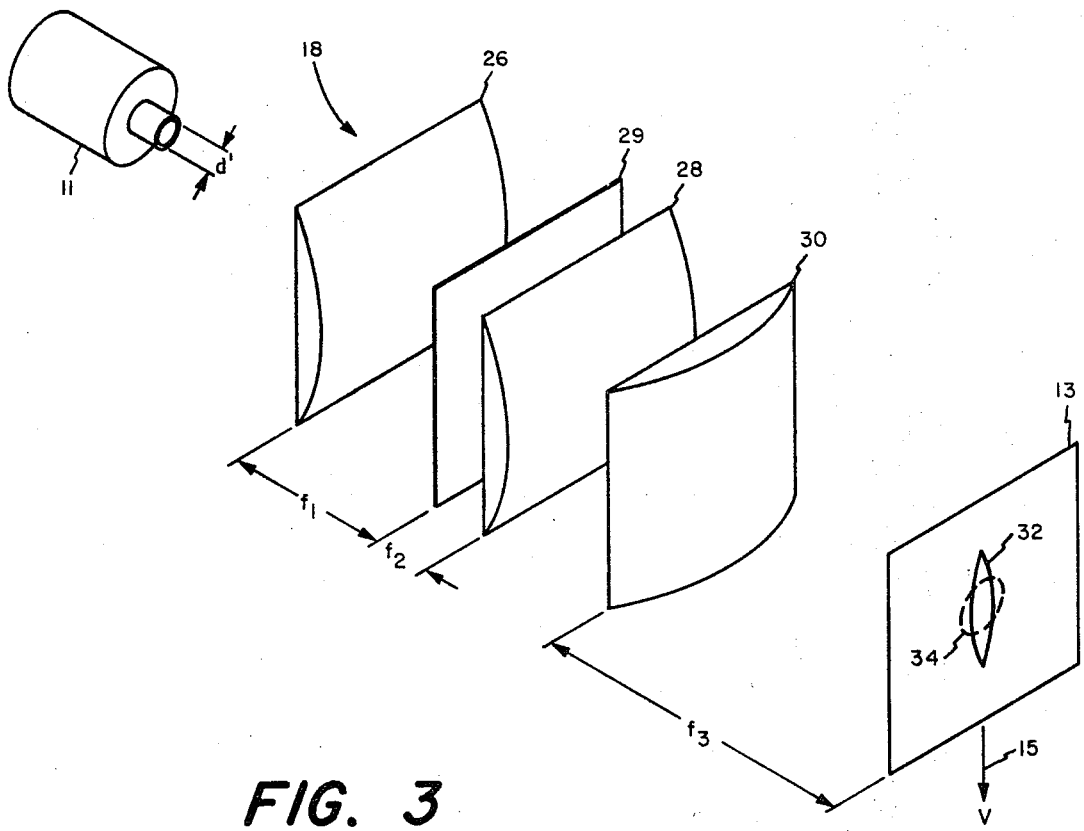
FIG. 3 is a perspective rendering of a lens element used in the present invention.

A noticeably improved version of the velocity measuring device of FIG. 1 is schematically depicted in FIG. 2 wherein like elements are represented by like reference characters. As before, laser 11 directs a beam of essentially monochromatic radiant energy toward the moving target surface 13. Generally speaking, such laser derived beams are inherently well collimated. However, to emphasize that the present invention does not necessarily require a laser source, but is applicable to nonlaser light sources as well, it will be assumed that the laser aperture in both the embodiments of FIGS. 1 and 2 represents a point source and that therefore the impingent beam has a spherical wave front diverging slightly as it progresses toward the target. In accordance with the present invention, a lens element represented generally by reference character 18 is interposed between the laser aperture and the target surface for collimating and reshaping of beam 12. As shown in more detail in FIG. 3, this lens element 18 in its preferred form comprises three cylindrical lenses 26, 28 and 30 arranged as illustrated. The focal planes of lenses 26 and 28 respectively are coincidental as indicated by plane 29 and the focal length $f_1$ of lens 26 may be, for example, $3 \times f_2$, the focal length of lens 28. When beam 12 emerges from lens 28 it is well collimated and because of the ratio $f_1/f_2$ has a substantially elliptical cross section having a major axis $3 \times$ times as long as its minor axis. The length of the minor axis at this point will remain roughly equal to the laser aperture $d'$. Since cylindrical lens 30 has its plane of curvature orthogonally related to the planes of curvature of cylindrical lenses 26 and 28 as shown, its effect upon beam shape is to narrow the minor axis of the beam's cross section without affecting collimation. This produces finally a beam having a cross sectional shape indicated generally by the ellipse 32. The reason for narrowing the minor axis of the beam is to increase the power density of illumination per unit area along the direction of vector 15. The focal length $f_3$ of lens 30 is chosen to coincide with the distance between the last mentioned lens' principal plane and the target surface 13 so as to bring the beam to a sharp focus in the plane of the target surface. In the absence of lens element 18, the laser will illuminate surface 13 with a beam having a cross section indicated generally by the dashed-line circle 34; thus, it is apparent that when beam 12 emerges from lens element 18 and impinges upon surface 13 it will have a reshaped elliptical cross section whose major axis is aligned with the pass-line vector 15. More importantly, the beam will be extremely well collimated which as will be more fully explained below enables the present invention to measure velocity independent of range-to-target. It will be noted that in the absence of lens 18 and more particularly, in the absence of a well collimated beam, velocity may still be measured accurately in which case, however, range-to-target as respects the receiver must be kept invariant.

A second lens element 24, which need be nothing more than a simple double-convex converging lens, is interposed between the illuminated area $d$ on surface 13 and the optical diffraction grating 22 as generally indicated. Although lens 24 is shown fixed to supporting structure 14, this is done only for convenience of illustration; obviously the lens may be supported independently of structure 14 by any suitable means.

In principle, the lens element 24 will image the surface 13 onto the diffraction grating 22 in which case each speckle sweeping across the grating will comprise contributions from scatters within a single resolvable element on the surface, the size of which is determined only by the resolution limit of the lens. And for even ordinary simple lenses of the type preferred, the dimensions of each single resolvable element on surface 13 will be so small that the phase relationship of the scatterers contained therein will not be affected by deviations in the radius of curvature of the backscattering surface. Hence, the output spectrum of photomultiplier 17 will remain narrow and the signal-to-noise ratio will remain high even under severe fluttering of surface 13.

Due to lens element 24, however, the velocity of each speckle across the grating now depends upon the ratio $q/p$ where $q$ represents the image distance and $p$ the object distance of the lens. Thus, if surface 13 is moved vertically as viewed in FIG. 2, the system's calibration constant will change accordingly. One important aspect of the prior art embodiment shown in FIG. 1 is that the calibration constant is independent of range-to-target and this desirable feature should be carried forward to the present invention. By collimating beam 12, as was described above in connection with FIG. 3, it is possible to maintain independence of calibration constant with vertical surface position as will be presently explained.

When the laser beam 12 is collimated, the relative phases of the scattering centers on surface 13 remain fixed as the surface moves through the beam. As a result of this, the effect in the plane of the optical grating or image plane of lens 24 (hereinafter referred to as the grating plane) is as though the surface motion always took place in the plane conjugate to the grating plane irrespective of the actual surface location. This means that the calibration constant will remain fixed and will depend only upon the lens-to-grating distance for a lens of a given focal length.

In the case of FIG. 2 where the surface 13 is shown to be conjugate to the grating plane the image of a single resolvable element on the surface comprises a "speckle" which moves across the grating with a velocity of $q/p$ times the surface velocity V.

Figure 4:
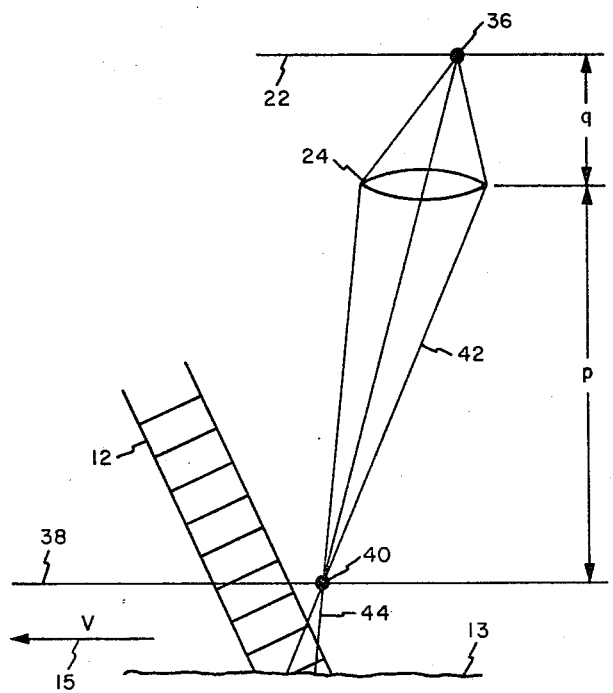
FIG. 4 is a schematic illustrating the principles of the invention.

Now suppose that the surface is not in the plane conjugate to the grating as would be the case under severe conditions of flutter. In this situation, shown generally in FIG. 4, the "speckles" imaged in the grating plane 22 each comprise a resolvable element 36 in that plane arising from contributions by all scatterers within the cones 42 and 44 subtended by lens 24. It may be said that the resolvable element at the grating constituting each speckle actually comprises the image of a portion of a "Huygens" field located within the constraints of a conjugate resolvable element 40. This portion of the field will always be derived from sources within the aforementioned cones since the lens can only permit light from the volume bounded by these cones to be placed at 36. In effect, then, a resolvable element in the grating plane "sees" only the field (real or virtual) within the conjugate resolvable element 40, and is unaware of the scatterers actually producing this field. Owing to the fact that beam 12 is collimated via lens element 18, as previously described, the phases of all contributing scatterers are fixed relative to each other; hence, the field may be imagined as being rigidly attached to the surface 13 and having a layer lying in the plane 38 conjugate to the grating plane 22. This layer, in turn, comprises a strip of "Huygens" emitters moving in the conjugate plane with a velocity equal to the surface velocity V. Accordingly, the speckle always moves in the grating plane with a velocity $q/pV$ and the system calibration constant remains substantially independent of vertical surface position.

In view of the foregoing, it should now be appreciated that the present invention provides a greatly improved velocity measuring system whose performance remains accurate and reliable despite dynamic anomalies in the backscattering surface. And although a preferred embodiment was described above in detail this was done only for purposes of illustration. Obviously, many modifications and variations within the spirit of the invention will occur to those skilled in the art, hence, it is desired that the present invention be limited only by the true scope of the appended claims.

What is claimed is:

1. Apparatus for determining the relative velocity between two objects comprising,
   means for directing a beam of monochromatic wave energy toward one of said objects whereby a portion of said energy is backscattered from the surface of said one object,
   said backscattered portion of energy comprising a pattern composed of a multiplicity of lobes having random amplitudes and phases, the phase of any one lobe remaining fixed relative to the phase of each and every other lobe,
   means for receiving said backscattered energy including at least one restricted aperture for producing an output signal the frequency of which is proportional to the relative velocity between said two objects,
   optical means for resolving said pattern into discrete finite elements and for focusing said elements in the plane of said restricted aperture, and
   means responsive to said receiving means for determining the frequency of said output signal.

2. The apparatus of claim 1 in which said means for directing a collimated beam of monochromatic wave energy toward one of said objects includes means for producing a collimated beam having a substantially elliptically shaped cross section, the major axis of which coincides with the relative velocity vector between said two objects.

3. The apparatus of claim 1 in which said optical means comprises a simple double-convex converging lens.

4. Apparatus for measuring the relative velocity between two objects comprising,
   means mounted on one of said objects for illuminating the other of said objects with a beam of light,
   first optical means disposed between said objects for collimating said beam whereby the light reflected from said other object comprises a multiplicity of speckles of light having random amplitudes and phases when viewed from a predetermined position in space, the phase of each of said speckles remaining fixed relative to one another,
   receiving means mounted on said one object including a series of restricted apertures aligned in a plane normal to the relative velocity vector defined by said two objects,
   said receiving means including means responsive to the reflected light passed through said series of restricted apertures for producing an output signal the frequency of which is directly related to the relative velocity between said two objects,
   second optical means disposed between said two objects for collecting a portion of said reflected light and for imaging the latter in the plane of series of apertures,
   said portion of light being imaged in said plane comprising a pattern of speckles each of which is smaller in size than it would normally be if viewed from said plane in the absence of said second optical means, and
   means responsive to said receiving means for determining the frequency of said output signal.

5. The apparatus of claim 4 wherein said second optical means comprises a simple converging lens whereby the size of each speckle in said pattern of said speckles imaged in said plane is determined by the resolution limit of said lens.

6. The apparatus of claim 4 wherein said first optical means further includes means for reshaping said collimated beam to increase the illumination per unit area on said other surface along the direction of said relative velocity vector.

7. In apparatus for determining the relative velocity between two objects comprising,
   means mounted on a first of said objects for directing a beam of electromagnetic energy toward the other of said objects,
   means including at least one restricted aperture mounted in fixed relation to said electromagnetic energy directing means for receiving the energy backscattered from the surface of said other object, said portion of backscattered energy forming an interference pattern in the plane of said restricted aperture whereby said receiving means produces an output signal the frequency of which is proportional to the relative velocity between said interference pattern and said restricted aperture and therefore proportional to the relative velocity between said first and other objects,
   means responsive to said receiving means for determining the frequency of said output signal, the improvement comprising:
   means disposed between said two objects for collimating said beam of electromagnetic energy, and means disposed between said receiving means and said other object for changing the nature of the interference pattern formed in the plane of restricted aperture so as to render said interference pattern impervious to random deviations in the backscattering surface of said other object.

8. The apparatus of claim 7 wherein said collimating means further includes means for producing a beam having a substantially elliptical cross section, the major axis of which coincides with the relative velocity vector determined by said two objects, and said means for changing the nature of the interference pattern comprises a lens element for imaging the interference pattern produced in the plane of the backscattering surface directly into the plane of said restricted aperture.

9. In apparatus for determining the relative velocity between two objects comprising, a source of monochromatic light mounted on the first of said objects for directing a narrow beam of light toward the second of said objects to illuminate a finite area thereon, said finite area providing a source of scatters for producing a diffraction pattern in space comprising a multiplicity of distinct lobes of random amplitudes and phases, an optical grating located on said first object being oriented substantially normal to the velocity vector determined by the relative velocity between said two objects, a photodetector located on said second object adjacent said grating on the side remote from said source of scatters for producing a plurality of signals from successive distinct lobes swept past said grating and for summing said signals to produce a sum output signal, and means for measuring the frequency of said sum output signal, the improvement comprising:

a converging lens element fixed in relation to said first object, said lens element having an object plane coincidental with said source of scatters and a conjugate image plane coincidental with said optical grating.

10. The apparatus of claim 9 further comprising, means for collimating said narrow beam of light whereby the random phases corresponding to said distinct lobes respectively remain fixed relative to one another.

References Cited

UNITED STATES PATENTS

| | | | |
|---|---|---|---|
| 3,432,237 | 3/1969 | Flower et al. | 356—28 |
| 3,409,369 | 11/1968 | Bickel | 356—28 |

RICHARD A. FARLEY, Primary Examiner

M. F. HUBLER, Assistant Examiner

U.S. Cl. X.R.

343—8